United States Patent
Chen et al.

(10) Patent No.: US 11,431,055 B2
(45) Date of Patent: Aug. 30, 2022

(54) BATTERY PACK

(71) Applicant: JIANGSU CONTEMPORARY AMPEREX TECHNOLOGY LIMITED, Changzhou (CN)

(72) Inventors: Zonghui Chen, Changzhou (CN); Lilei Su, Changzhou (CN); Jianhua Liu, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 192 days.

(21) Appl. No.: 16/576,165

(22) Filed: Sep. 19, 2019

(65) Prior Publication Data

US 2021/0028418 A1    Jan. 28, 2021

(30) Foreign Application Priority Data

Jul. 23, 2019  (CN) .......................... 201921168551.3

(51) Int. Cl.
*H01M 50/20* (2021.01)

(52) U.S. Cl.
CPC ............. *H01M 50/20* (2021.01); *Y02E 60/10* (2013.01)

(58) Field of Classification Search
None
See application file for complete search history.

(56) References Cited

U.S. PATENT DOCUMENTS

2012/0321927 A1* 12/2012 Loo ...................... H01M 50/20
                                                                  429/100
2019/0140232 A1   5/2019 Ogawa et al.
(Continued)

FOREIGN PATENT DOCUMENTS

| CN | 108482090 A | 9/2018 |
|---|---|---|
| EP | 3483947 A1 | 5/2019 |
| EP | 3508368 A1 | 7/2019 |

OTHER PUBLICATIONS

The Advantage of Spring Latches, Aug. 30, 2013, Industrial Quick Search Manufacture Directory, https://blog.iqsdirectory.com/spring-latches/ (Year: 2013).*

(Continued)

*Primary Examiner* — Ula C Ruddock
*Assistant Examiner* — Mary Grace Byram
(74) *Attorney, Agent, or Firm* — Millen, White, Zelano & Branigan, P.C.; William Nixon; Christin Montfort

(57) ABSTRACT

The present disclosure provides a battery pack including a mounting beam and a battery module connected to the mounting beam. The mounting beam is provided with a limiting protrusion and a limiting recess, and a limiting space is formed between the limiting protrusion and the mounting beam. The battery module is provided with a limiting sheet and an engaging assembly, at least a portion of the limiting sheet is inserted into the limiting space, and the engaging assembly is engaged with the limiting recess. In the battery pack according to the present disclosure, the cooperation between the limiting protrusion and the limiting sheet as well as the cooperation between the engaging assembly and the limiting recess can limit the battery module in directions X, Y and Z, thereby effectively fixing the battery module, simplifying the mounting process, and improving the mounting efficiency.

9 Claims, 6 Drawing Sheets

(56) References Cited

U.S. PATENT DOCUMENTS

| | | |
|---|---|---|
| 2019/0190096 A1 | 6/2019 | Shen et al. |
| 2020/0014004 A1* | 1/2020 | Bende .................. H01M 10/482 |
| 2020/0016984 A1* | 1/2020 | Mantea ................. B60L 53/665 |
| 2020/0287182 A1* | 9/2020 | Kong .................. H01M 50/209 |

OTHER PUBLICATIONS

Glassen, Ken. Snap-Fit Connections Can Help Manufacturers Save Time and Money. May 30, 2018. Kaysun Blog. (Year: 2018).*
Search report in corresponding EP19196171 dated Mar. 20, 2020 (pp. 1-6).

* cited by examiner

BATTERY PACK

CROSS-REFERENCE TO RELATED APPLICATIONS

The present application claims priority to Chinese Patent Application No. 201921168551.3, filed on Jul. 23, 2019, the content of which is incorporated herein by reference in its entirety.

TECHNICAL FIELD

The present disclosure relates to the technical field of battery, and in particular, to a battery pack.

BACKGROUND

During an assembling process of a battery pack, a battery module is generally bolted to a lower case of the battery pack. In an automatic assembling process, the battery module is placed at an appropriate position by a manipulator, and then the bolt is tightened. Such mounting manners are complicated and thus has a low mounting efficiency.

SUMMARY

In view of the technical problems in the related art, the present disclosure provides a battery pack, which avoids the use of bolt during the mounting process of the battery module, so that the mounting efficiency is high and it is simple and easy to perform the mounting process.

The present disclosure provides battery pack, including a mounting beam and a battery module connected to the mounting beam; the mounting beam is provided with a limiting protrusion and a limiting recess, and a limiting space is formed between the limiting protrusion and the mounting beam; and the battery module is provided with a limiting sheet and an engaging assembly, at least a portion of the limiting sheet is inserted into the limiting space, and the engaging assembly is engaged with the limiting recess.

In an embodiment, the engaging assembly includes an engaging portion, the engaging portion is connected to the limiting sheet and the engaging portion is engaged with the limiting recess.

In an embodiment, the limiting sheet is provided with a through-hole penetrating along a direction Z, the engaging portion includes a limiting column, the limiting column is slidably connected to the through-hole, and a lower end of the limiting column protrudes from the through-hole and is engaged with the limiting recess.

In an embodiment, the engaging assembly further includes a positioning sleeve, the positioning sleeve is fixed to the limiting sheet, and the positioning sleeve includes a receiving cavity penetrating in the direction Z, the receiving cavity is in communication with the through-hole, and the limiting column is slidably connected to the receiving cavity and the through-hole.

In an embodiment, the limiting column includes a first segment and a second segment connected to the first segment, the second segment has a larger diameter than the first segment, and a lower end of the second the segment protrudes from the through-hole and is engaged with the limiting recess. The engaging assembly further includes a spring, and the spring is received in the receiving cavity and sleeved on an outer circumference of the first segment.

In an embodiment, the limiting protrusion includes a first connecting portion and a blocking portion; the first connecting portion is connected to the mounting beam, and the blocking portion is connected to the first connecting portion and spaced apart from the mounting beam to form the limiting space.

In an embodiment, an upper surface of the limiting sheet is a horizontal surface, and at least a part of the upper surface of the limiting sheet abuts against the blocking portion.

In an embodiment, an upper surface of the limiting sheet is an inclined surface, the inclined surface is inclined upward in a direction X from a side of the limiting sheet facing away from the engaging assembly, and the inclined surface of the limiting sheet is engaged with an end of the blocking portion.

In an embodiment, the limiting protrusion is provided with a first opening at a side in a direction X, the first opening is in communication with the limiting space, and at least a portion of the limiting sheet is inserted into the limit space via the first opening.

In an embodiment, the battery module includes an end plate, the end plate is disposed at an end of the battery module in a direction Y, and the limiting sheet is connected to the end plate and located at a bottom of the end plate.

The beneficial effects of the present disclosure are described as below.

In the battery pack according to the present disclosure, a cooperation between the limiting protrusion and the limiting sheet as well as a cooperation between the engaging assembly and the limiting recess can limit the battery module in directions X, Y and Z, thereby effectively fixing the battery module, and such design simplifies the mounting process, and improves the mounting efficiency.

Figure 1:
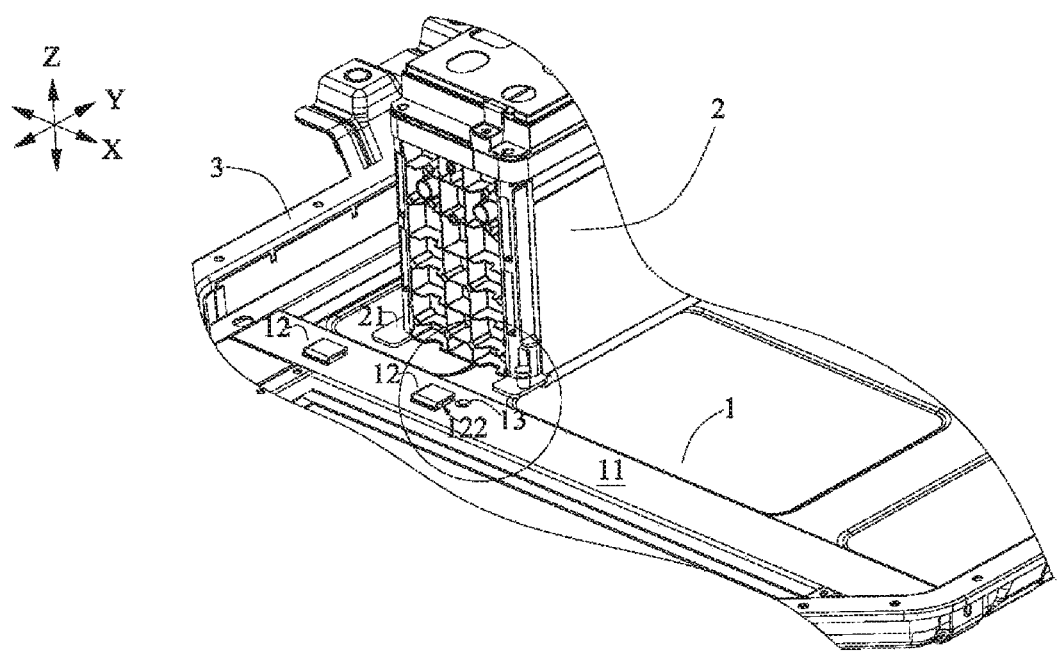
FIG. 1 is a partial perspective diagram of a battery module in a battery pack according to the present disclosure when it is not assembled with a mounting beam.

The reference signs in the drawings are listed as follows:

| | |
|---|---|
| 1 mounting beam | 211 through-hole |
| 11 first surface | 22 engaging assembly |
| 12 limiting protrusion | 221 positioning sleeve |
| 121 first opening | S receiving cavity |
| 122 limiting space | 222 engaging portion |
| 123 second opening | 222A cap body |
| 124 first connecting portion | 222B limiting column |
| 125 blocking portion | P1 first segment |
| 126 second connecting portion | P2 second section |
| 13 limiting recess | 223 spring |
| 2 battery module | 23 end plate |
| 21 limiting sheet | 3 lower case |

DESCRIPTION OF EMBODIMENTS

Embodiments of the present disclosure are shown in the accompanying drawings, and it should be understood that the disclosed embodiments are only examples of the present disclosure. The present disclosure can be implemented in various forms, and thus the specific details disclosed herein, instead of being limitation, should be merely construed as the basis of the claims and as basis for instruct those skilled in the art to implement the present disclosure in various manners.

Further, terms indicating directions of operation and configuration of respective components of the battery pack according to the embodiments of the present disclosure, such as direction X, direction Y and direction Z, are relative terms rather than absolute terms. Even though the indications are appropriate when the components are located in the positions shown in the drawings, the directions can be interpreted in different ways in accordance with change of the positions.

In the present disclosure, terms such as "first" and "second" are merely used for descriptive purposes, and should not be construed as indicating or implying relative importance; term "plurality of" means two or more; unless otherwise specified or stated, terms such as "connected", "fixed", etc. shall be understood in broad scope. For example, "connected" may indicate either a fixed connection, a detachable connection, an integral connection, an electrical connection, or a signaled connection; "connected" also can indicate a direct connection or an indirect connection via an intermediate medium. For those skilled in the art, the specific meanings of the above terms in the present disclosure can be understood on a case-by-case basis.

Figure 3:
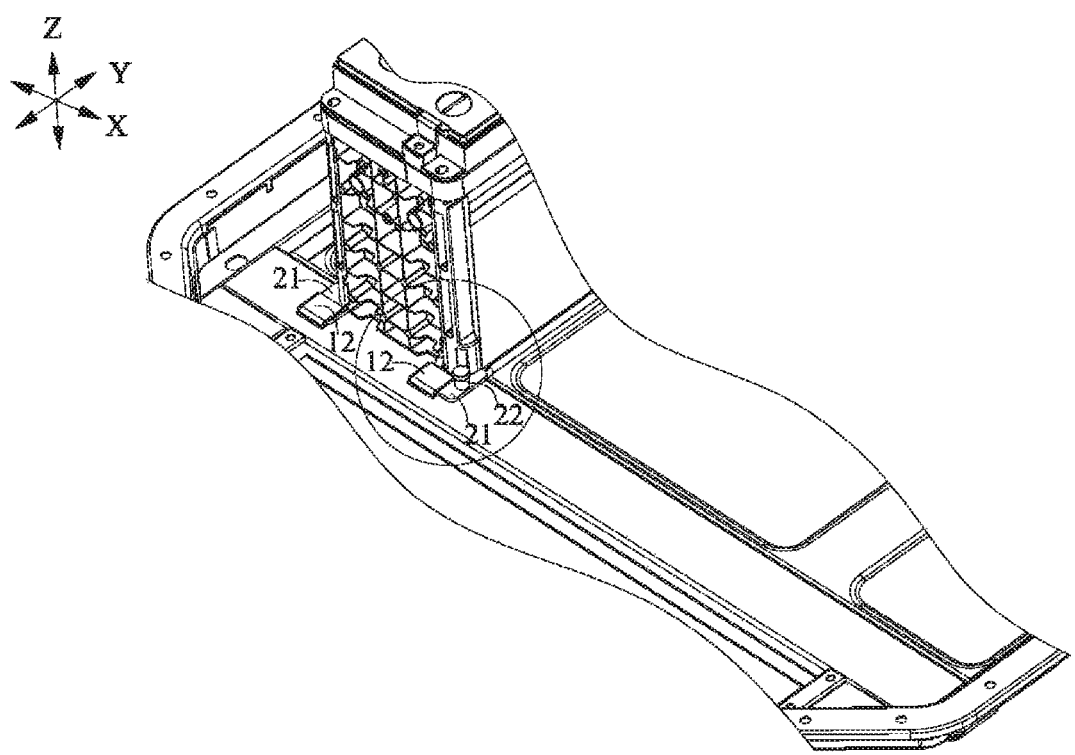
FIG. 3 is a partial perspective diagram of a battery module in a battery pack according to the present disclosure when it has been assembled with a mounting beam.
Figure 4:
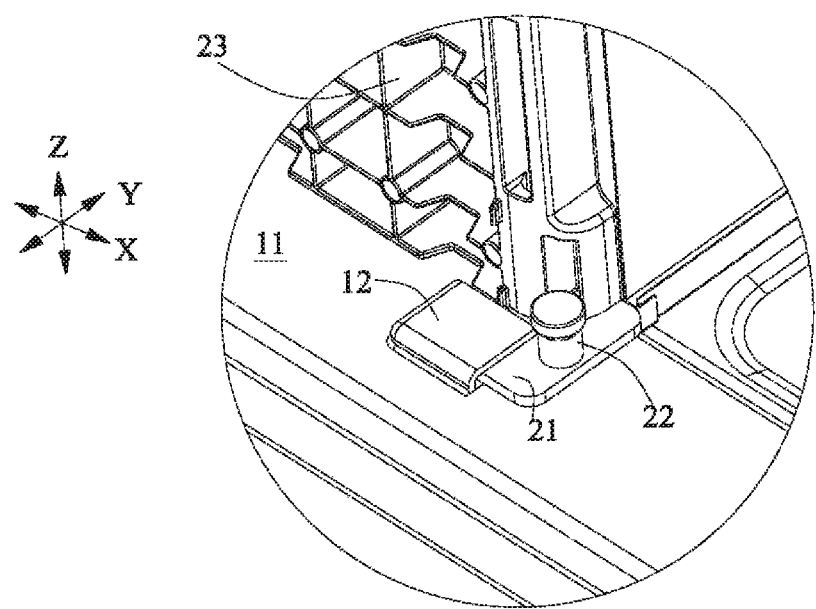
FIG. 4 is a partial enlarged view of a circled portion in FIG. 3.
Figure 5:
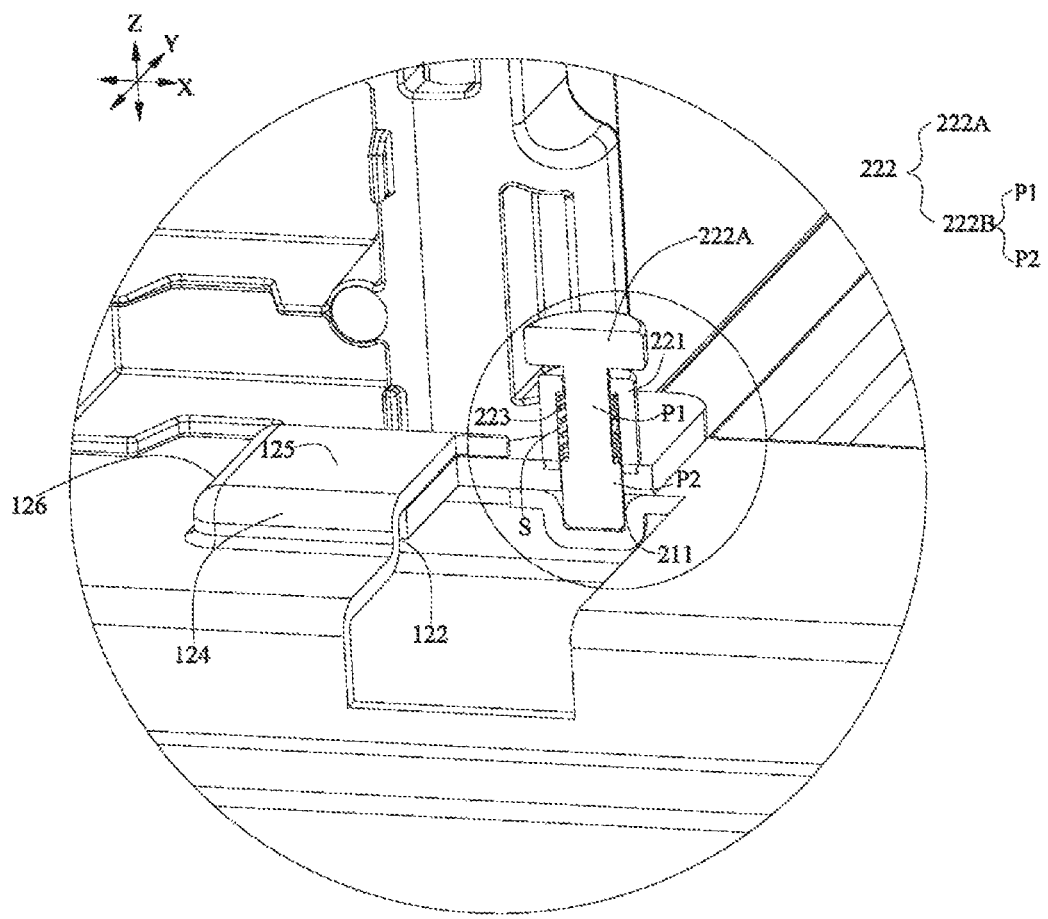
FIG. 5 is a partial section view illustrating an embodiment of FIG. 3.

Referring to FIG. 1 and FIG. 3, a battery pack according to the present disclosure includes a lower case 3, a mounting beam 1 fixed in the lower case 3, and a battery module 2 connected to the mounting beam 1.

Figure 2:
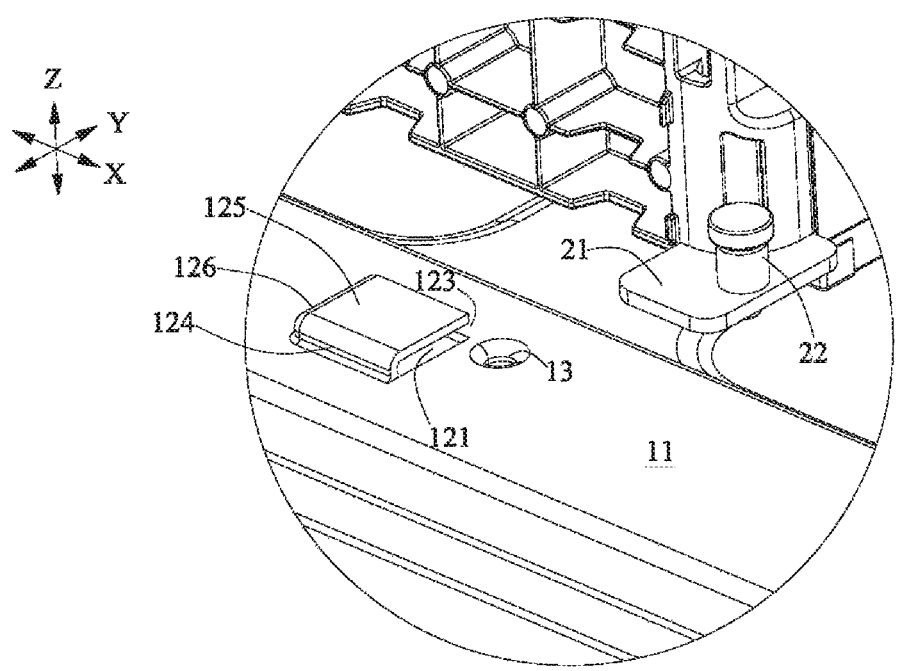
FIG. 2 is a partial enlarged view of a circled portion in FIG. 1.

Referring to FIG. 1 and FIG. 2, the mounting beam 1 extends in a direction X, and the mounting beam 1 includes a first surface 11. The mounting beam 1 is provided with a limiting protrusion 12 and a limiting recess 13.

The limiting protrusion 12 protrudes upward from the first surface 11. A limiting space 122 is formed between the limiting protrusion 12 and the mounting beam 1.

The limiting space 122 formed by the limiting protrusion 12 has various designs. In a first embodiment, the limiting protrusion 12 includes a first connecting portion 124 and a blocking portion 125, the first connecting portion 124 is connected to the mounting beam 1, and the blocking portion 125 is connected to the first connecting portion 124 and spaced apart from the mounting beam 1 to form the limiting space 122. In this embodiment, the first connecting portion 124 extends upward from the first surface 11, the first connecting portion 124 is located on a side of the blocking portion 125 facing away from the battery module 2 in a direction Y, and the blocking portion 125 extends from an end of the first connecting portion 124 towards the battery module 2 along the direction Y. The limiting protrusion 12 has a first opening 121 formed at a side along the direction X. For example, the limiting protrusion 12 has first openings 121 on both sides in the direction X. The first opening 121 is in communication with the limiting space 122 such that at least a portion of a limiting sheet 21 described below is inserted into the limiting space 122 via the first opening 121, and the limiting protrusion 12 is pressed against the limiting sheet 21 along a direction Z, so as to limit the movement of the battery module 2 in the direction Z In this way, when the battery pack is subjected to impacting or vibration, the battery module 2 inside the battery pack is prevented from moving in the direction Z, thereby improving stability and safety of the battery pack. In addition, the limiting protrusion 12 also has a second opening 123 on a side in the direction Y, the second opening 123 is opposite to the first connecting portion 124 in the direction Y, and the second opening 123 is provided in such manner that a dimension of the limiting sheet 21 in the direction Y does not exceed the position of the first connecting portion 124. In this regard, the limiting sheet 21 is structurally simplified, and can be easily inserted into the limiting space 122, thereby improving the assembling efficiency of the battery pack. It should be understood that, in the present embodiment, the first connecting portion 124 can also be disposed on a side of the blocking portion 125 close to the battery module 2 in the direction Y, and correspondingly, the blocking portion 125 extends from the end of the first connecting portion 124 along a direction facing away from the battery module 2 in the direction Y. The first openings 121 are disposed on both sides of the limiting protrusion 12 in the direction X, and the second opening 123 is disposed on the side opposite to the first connecting portion 124 in the direction Y. Such a design requires that the limiting sheet 21 is disposed to be in a L-shaped structure connected to an end of the end plate 23, such that the limiting sheet 21 can be smoothly inserted into the limiting space 122 formed by the first connecting portion 124 and the blocking portion 125, thereby achieving fixing of the battery module 2 in the Z direction by the limiting protrusion 12.

In a second embodiment, the limiting protrusion 12 includes a second connecting portion 126 in addition to the first connecting portion 124 and the blocking portion 125. In this embodiment, the second connecting portion 126 is connected between the first connecting portion 124 and the blocking portion 125, and the second connecting portion 126 is located at a side of the limiting projection 12 facing away from the limiting recess 13 described below along the direction X. In this embodiment, the limiting protrusion 12 is provided with a first opening 121 at the side in the direction X. For example, the first opening 121 is provided at a side of the limiting protrusion 12 opposite to the second connecting portion 126 in the direction X. The first opening 121 is in communication with the limiting space 122, and at least a portion of the limiting sheet 21 is inserted into the limiting spacing 122 via the first opening 121. The limiting protrusion 12 also has a second opening 123 at a side along the direction Y, and the second opening 123 is opposite to the first connecting portion 124 in the direction Y. It should be noted that, in this embodiment, when mounting the battery module 2, at least a portion of the limiting sheet 21, which will be further described below, is inserted into the limiting space 122, and the inserted portion should not interfere with the second connecting portion 126, such that the positioning between the limiting recess 13 close to the first opening 121 and an engaging assembly 22 is not affected.

In a third embodiment, the limiting protrusion 12 includes a third connecting portion (not shown) in addition to the first connecting portion 124, the blocking portion 125, and the second connecting portion 126. In this embodiment, the third connecting portion is connected to the second connecting portion 126 and the blocking portion 125, and the third connecting portion is opposite to the first connecting portion 124 along the direction Y. Due to the presence of the third connecting portion, the limiting sheet 21 is provided in a L-shaped structure connected to an end of the end plate 23, such that the limiting sheet 21 can be inserted into the limiting space 122. The limiting protrusion 12 is provided with a first opening 121 at the side in the direction X. For example, the first opening 121 is provided at a side of the limiting protrusion 12 along a direction facing away from the second connecting portion 126 in the direction X. Due to the presence of the first connecting portion 124, the second connecting portion 126 and the third connecting portion, by forming only one first opening 121 that is in communication with the limiting space 122, at least a portion of the limiting sheet 21 is inserted into the limiting spacing 122 via the first opening 121. In addition, at least a portion of the limiting protrusion 12 abuts against the limiting sheet 21 along the direction Z to restrict the movement of the battery module 2 in the direction Z, such that the battery module 2 inside the battery pack is prevented from moving in the direction Z when the battery pack is subjected to impacting or vibration, thereby improving the stability and safety of the battery pack. The design of the limiting protrusion 12 is not limited to the above three embodiments, and other design forms are also possible, which are not specifically described herein. Regardless of the design form, it is merely required that the limiting sheet 21 can be inserted into the limiting space 122 without affecting the positioning between the limiting recess 13 on the side of the first opening 121 and the engaging assembly 22, and the specific design form of the limiting protrusion 12 can be selected as needed.

The limiting protrusion 12 and the mounting beam 1 can be formed into one piece. That is, the limiting protrusion 12 is formed in such manner that a partial region of the mounting beam 1 is first stamped to form a protrusion, and then side portions of the protrusion are cut to form the corresponding opening and limiting space 122; or the limiting protrusion 12 is directly formed by injection molding of the mounting beam 1, the corresponding opening of the limiting protrusion 12 is formed by a subsequent cutting process. The formation of the limiting protrusion 12 is not limited thereto, and the limiting protrusion 12 can also be formed by welding, i.e., the limiting protrusion 12 is welded to the mounting beam 1 via a separate component.

The limiting recess 13 is provided at a side of the first opening 121 of the limiting protrusion 12 and is formed by recessing from the first surface 11. The limiting recess 13 has a shape matching the engaging portion 222 described below, so as to position the engaging assembly 22.

As shown in FIG. 1 and FIG. 3, the battery module 2 is provided with the limiting sheet 21 and the engaging assembly 22, and the engaging assembly 22 is connected to the limiting sheet 21. The battery module 2 further includes an end plate 23 disposed at an end of the battery module 2 in the direction Y, and the limiting sheet 21 is connected to the end plate 23 and located at a bottom of the end plate 23.

The limiting sheet 21 is at least partially inserted into the space 122. For example, at least a portion of the limiting sheet 21 is inserted into the space 122 via the first opening 121, as described above. In an embodiment, an upper surface of the limiting sheet 21 is a horizontal surface, and the upper surface of at least a portion (the inserted portion) of the limiting sheet 21 abuts against the blocking portion 125, which restricts the displacement of the battery module 2 in the direction Z and thus prevents the battery module 2 from moving in the direction Z, thereby improving the stability and safety of the battery pack. In another embodiment, the upper surface of the limiting sheet 21 is an inclined surface, and the inclined surface is inclined upward in the direction X from a side facing away from the engaging assembly 22. The design of the inclined surface provides a guiding for insertion of the limiting sheet 21 into the limiting space 122, thereby facilitating the insertion of at least part of the limiting sheet 21 into the limiting space 122. It should be noted that an inclined angle of the inclined surface should ensure that the inclined surface of the insertion portion of the limiting sheet 21 is engaged with the end of blocking portion 125 when the engaging assembly 22 described below is engaged with the limiting recess 13. In this way, the blocking portion 125 can limit the limiting sheet 21 in the direction Z when the engaging assembly 22 described below is engaged with the limiting recess 13.

As shown in FIG. 3 to FIG. 6, the engaging assembly 22 is engaged with the limiting recess 13. With the engagement between the engaging assembly 22 and the limiting recess 13, the battery module 2 can be limited in the direction X and the direction Y, preventing the battery module 2 from moving in the direction X and the direction Y. Further, as described above, since at least a portion of the limiting sheet 21 is inserted into the limiting space 122, the battery module 2 is also limited in the direction Z. Therefore, the battery module 2 is limited in the directions X, Y and Z and thus can be fixed effectively, thereby preventing the battery module 2 from moving in any direction. In this way, when the battery pack is subjected to impacting or vibration, the battery module 2 inside the battery pack is prevented from shaking, thereby improving the stability and safety of the battery pack. In addition, compared with bolting known in the related art, the engagement between the engaging assembly 22 and the limiting recess 13 as well as the cooperative design between the limiting sheet 21 and the limiting protrusion 12 can achieve the easier and more convenient mounting process, and increase the assembling efficiency.

The engaging assembly 22 has various designs. In an embodiment, the engaging assembly 22 includes an engaging portion 222. The engaging portion 222 is connected to the limiting sheet 21, and the engaging portion 222 is engaged with the limiting recess 13.

The engaging portion 222 is also available in various designs. For example, the engaging portion 222 can have a cylindrical shape, or the engaging portion 222 can be in a form of an elastic hook.

When the engaging portion 222 is provided in a cylindrical shape, the limiting sheet 21 is provided with a through-hole 211 penetrating in the direction Z, and the engaging portion 222 includes a limiting column 222B. The limiting column 222B is slidably connected to the through-hole 211, and a lower end of the limiting column 222B protrudes from the through-hole 211 and is engaged with the limiting recess 13. Since the lower end of the limiting column 222B is engaged with the limiting recess 13, the battery module 2 is limited in the direction X and the direction Y, and thus the battery module 2 is prevented from moving in the direction X and the direction Y, thereby improving the stability of the battery pack. In addition, when the engaging portion 222 is provided in the form of the limiting column 222B, the battery module 2 can be not only positioned but also detachable. When disassembly is required, the limiting column 222B is pulled along the direction Z, and then the battery module 2 is slid in a direction opposite to an assembling direction until the limiting sheet 21 is completely slid out of the limiting space 122, so as to detach the battery module 2. This detachable design improves the utilization of the battery module and facilitates the maintenance of the battery module 2, thereby saving costs. In this embodiment, the engaging portion 222 can further include a cap body 222A, the cap body 222A has a larger size than the through-hole 211, and the cap body 222A is positioned above the limiting sheet 21 to prevent the engaging portion 222 from being detached from the through-hole 211 of the limiting sheet 21 during transfer of the battery module 2.

When the engaging portion 222 is provided in the form of an elastic hook (not shown), the limiting sheet 21 is provided with a receiving groove at a bottom surface. One end of the elastic engaging portion 222 is connected to the limiting sheet 21, and the other end thereof is provided as a hook. The hook is bent towards the limiting recess 13, and the elastic engaging portion 222 can be pressed in the direction Z, so as to be received in the receiving groove. In this way, the battery module can smoothly slide on the first surface 11 when the first surface 11 of the mounting beam 1 is sliding, and when the hook of the elastic engaging portion 222 is moving along the direction X to a position aligned with the limiting recess 13, the hook flips into the limiting recess 13 and is engaged with the limiting recess 13. At this moment, at least a portion of the limiting sheet 21 is inserted in the limiting space 122. Such design also achieve the positioning of the battery module 2 in the direction X and direction Y. It should be noted that, regardless of the design form of the engaging portion 222 of the above engaging assembly 22, the battery module 2 is fixed by a sliding manner during the mounting process. During the sliding process of the battery module 2, the engaging portion 222 can be automatically engaged with the limiting recess 13 once the engaging assembly 22 is aligned with the limiting recess 13. In this regard, the problem of bolting known in the related art that the assembly may fail when a fixing hole of the end plate is not aligned with a fixing hole of the mounting beam 1 can be avoided, and the engagement between the engaging assembly 22 and the limiting recess 13 reduces the mounting complexity and improves the mounting efficiency.

In another embodiment, when the engaging portion 222 is provided in the cylindrical shape, the engaging assembly 22 further includes a positioning sleeve 221. The positioning sleeve 221 is fixed to the limiting sheet 21, and the positioning sleeve 221 includes a receiving cavity S penetrating in the direction Z. The receiving cavity S is in communication with the through-hole 211, and the limiting column 222B is slidably connected to the receiving cavity S and the through-hole 21. The lower end of the limiting column 222B protrudes from the through-hole 211 and is engaged with the limiting recess 13. The positioning sleeve 221 can position the engaging portion 222, and avoids a situation that the engaging portion 222 fails to be fixedly positioned in the through-hole 211 of the limiting sheet 21 due to a relatively small thickness of the limiting sheet 21, thereby preventing an inclination of the engaging portion 222 during the assembling process. A lower end of the positioning sleeve 221 is fixed to the limiting sheet 21 by pressing rivet, but not limited thereto. The positioning sleeve 221 can be fixed to the limiting sheet 21 by other methods, such as welding, bonding, etc., which will not be specifically described herein. In this embodiment, if the engaging portion 222 is also provided with the cap body 222A, the cap body 222A should have a larger size than the receiving cavity S, and the cap body 222A is located above the positioning sleeve 221. In this way, the engaging portion 222 is protected from being detached from the receiving cavity S of the positioning sleeve 221 during transfer of the battery module 2. In this embodiment, the battery module 2 can also be detachable, and the insertion or detachment is performed in the same manner as the engaging portion 222 without the positioning sleeve 221, which will not be repeated herein.

Figure 6:
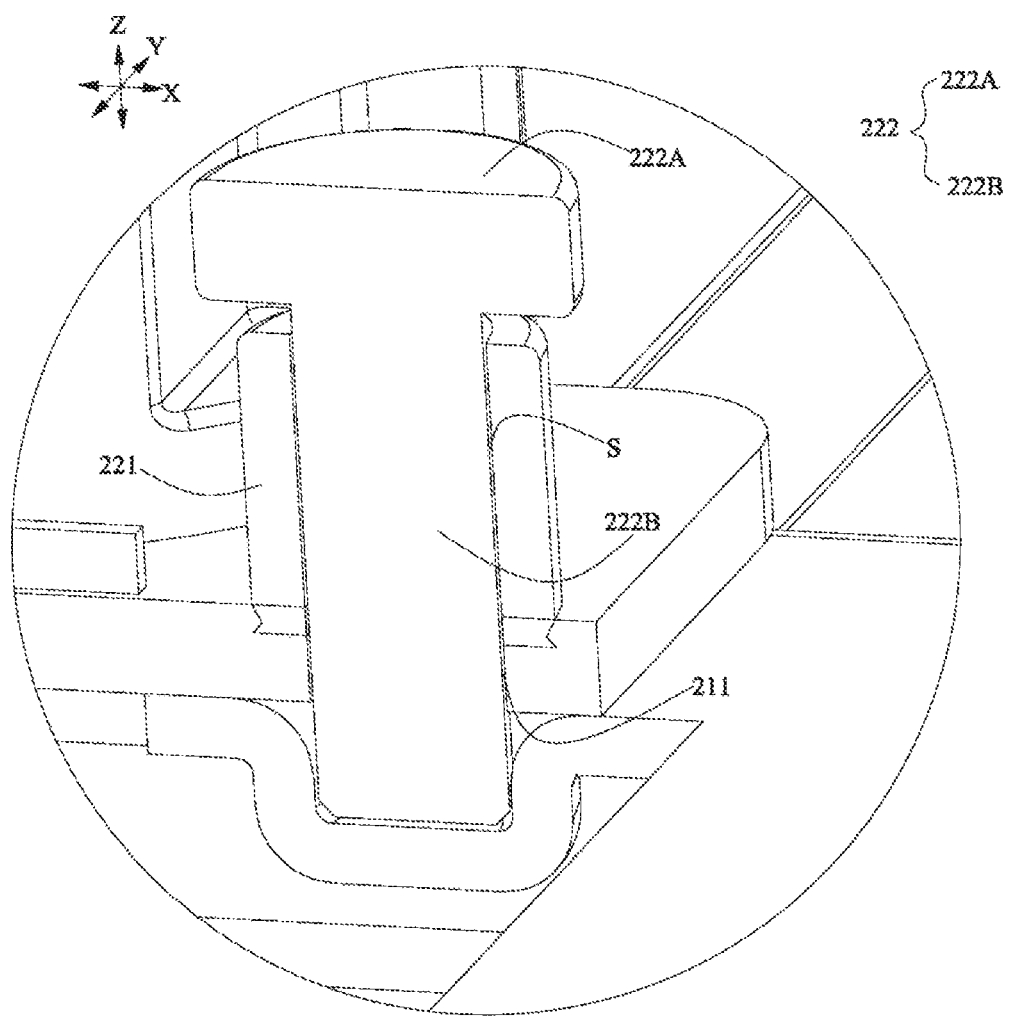
FIG. 6 is a partial section view illustrating another embodiment of FIG. 3.

In yet another embodiment, as shown in FIG. 6, when the engaging portion 222 is provided in the cylindrical shape, the engaging assembly 22 further includes a spring 223, in addition to the engaging portion 222 and the positioning sleeve 221. In this embodiment, the limiting column 222B includes a first segment P1 and a second segment P2 connected to the first segment P1, the second segment P2 has a larger diameter than the first segment P1, and a lower end of the second the segment P2 protrudes from the through-hole 211 and is engaged with the limiting recess 13. The spring 223 is received in the receiving cavity S and sleeved on an outer circumference of the first segment P1. During the assembling process of the battery module 2, when the lower end surface of the second section P2 is flush with the bottom surface of the limiting sheet 21, the spring 223 is compressed between an upper end of the second section P2 and an upper end surface of the receiving cavity S. When the battery module 2 slides on the mounting beam 1 and the engaging assembly 22 moves to a position aligned with the limiting recess 13, the spring 223 bounces off and pushes the lower end of the limiting column 222B into the limiting recess 13, thereby promptly positioning the limiting column 222B in the limiting recess 13, and preventing the limiting column 222B from being stuck in the receiving cavity S of the positioning sleeve 221 and the through-hole 211 of the limiting sheet 21. This can achieve positioning of the battery module in the direction X and the direction Y, while improving the mounting efficiency of the battery module 2.

The specific process of mounting the battery module 2 on the mounting beam 1 will be described in detail below with an example of the engaging assembly 22 including the engaging portion 222, the positioning sleeve 221 and the spring 223.

First, a manipulator transports the battery module 2 to above the corresponding mounting beam 1, and then places the battery module 2 on the side of the limiting recess 13 of the mounting beam 1, and the manipulator pushes the battery module 2 along the direction X in such a manner that the battery module 2 slides on the first surface 11 of the mounting beam 1. At this time, the spring 223 of the engaging assembly 22 is in a compressed state, and when the engaging assembly 22 of the battery module 2 moves along the direction X to a position aligned with the limiting recess 13 on the mounting beam 1, the spring 223 of the engaging assembly 22 pushes the limiting column 222B into the limiting recess 13, so as to position the battery module 2 in the direction X and direction Y. In the meantime, at least a portion of the limiting sheet 21 that is located in front of the engaging assembly 22 is inserted into the limiting space 122, and the inserted portion abuts against the blocking portion 125, thereby positioning the battery module 2 in the direction Z. In this way, the battery module 2 is mounted and the battery module 2 is positioned in directions X, Y and Z, respectively, to avoid the displacement of battery module 2, thereby improving the safety and stability of the battery pack. Furthermore, such sliding and automatically positioning mounting process can be performed in an easier way and has a higher mounting efficiency than the bolting known in the related art.

In the battery pack according to the present disclosure, two end plates 23 are provided and disposed at two sides of the battery module 2 along the direction Y, respectively. Each end plate 23 includes two limiting sheets 21, and the two limiting sheets 21 are disposed at two sides of the end plate 23, respectively. At least one limiting sheet 21 is provided with the engaging assembly 22. Two mounting beams 1 are provided and disposed at two sides of the battery module 2 along the direction Y, respectively. A number of the limiting protrusions 12 on each mounting beam 1 corresponds to a number of the limiting sheets 21 of each end plate 23, and a number of the limiting recesses 13 on each mounting beam 1 also corresponds to a number of the engaging assemblies 22.

In an embodiment, one of the two limiting sheets 21 on each end plate 23 is provided with the engaging assembly 22, and the two limiting sheets 21 each provided with the engagement assembly 22 on the two end plates 23 are located at diagonal corners. The two engaging assemblies 22 located at the diagonal corners can ensure the positioning of the battery module 2 in a plane defined by the direction X and the direction Y, and thus the battery module 2 is effectively fixed.

In another embodiment, each limiting sheet 21 on each end plate 23 is provided with the engaging assembly 22. Similarly, the engaging assemblies 22 at four corners further position the battery module 2, so as to prevent the battery module 2 from moving in the plane defined by the direction X and the direction Y.

The above detailed description describes various exemplary embodiments, but is not intended to be limited to the specific combination. Accordingly, the various features disclosed herein can be combined to form various other combinations that are not illustrated for the sake of clarity.

What is claimed is:

1. A battery pack, comprising:
   a mounting beam (1); and
   a battery module (2) connected to the mounting beam (1),
   wherein the mounting beam (1) is provided with a limiting protrusion (12) and a limiting recess (13), the limiting protrusion (12) and the limiting recess (13) are arranged at different positions on the mounting beam (1), and a limiting space (122) is formed between the limiting protrusion (12) and the mounting beam (1), and
   the battery module (2) is provided with a limiting sheet (21) and an snap-in assembly (22), at least a portion of the limiting sheet (21) is inserted into the limiting space (122), and the snap-in assembly (22) is inserted into the limiting recess (13) by a snap-fit manner without any thread,
   wherein the battery module (2) comprises an end plate (23), the end plate (23) is disposed at an end of the battery module (2) in a direction Y, and the limiting sheet (21) is connected to the end plate (23) and located at a bottom of the end plate (23), and the limiting sheet (21) is located at a side of the end plate (23) facing away from the battery module (2), and extends in the direction Y and along a direction away from the battery module (2), and
   the limiting sheet (21) has a through-hole (211) formed therein, and when the battery module (2) is installed to the mounting beam (1), the through-hole (211) is located just above the limiting recess such that the snap-in assembly (22) penetrates through the through-hole (211) to be inserted into the limiting recess (13).

2. The battery pack according to claim 1, wherein the snap-in assembly (22) comprises an engaging portion (222), the engaging portion (222) is connected to the limiting sheet (21) and the engaging portion (222) is engaged with the limiting recess (13).

3. The battery pack according to claim 2, wherein the limiting sheet (21) is provided with a through-hole (211) penetrating along a direction Z,
   the engaging portion (222) comprises a limiting column (222B), the limiting column (222B) is slidably connected to the through-hole (211), and a lower end of the limiting column (222B) protrudes from the through-hole (211) and is engaged with the limiting recess (13).

4. The battery pack according to claim 3, wherein the snap-in assembly (22) further comprises a positioning sleeve (221), the positioning sleeve (221) is fixed to the limiting sheet (21), and the positioning sleeve (221) comprises a receiving cavity (S) penetrating in the direction Z, the receiving cavity (S) is in communication with the through-hole (211), and the limiting column (222B) is slidably connected to the receiving cavity (S) and the through-hole (211).

5. The battery pack according to claim 4, wherein the limiting column (222B) comprises a first segment (P1) and a second segment (P2) connected to the first segment (P1), the second segment (P2) has a larger diameter than the first segment (P1), and a lower end of the second the segment (P2) protrudes from the through-hole (211) and is engaged with the limiting recess (13), and
   the snap-in assembly (22) further comprises a spring (223), and the spring (223) is received in the receiving cavity (S) and sleeved on an outer circumference of the first segment (P1).

6. The battery pack according to claim 1, wherein the limiting protrusion (12) comprises a first connecting portion (124) and a blocking portion (125),
   the first connecting portion (124) is connected to the mounting beam (1), and the blocking portion (125) is connected to the first connecting portion (124) and spaced apart from the mounting beam (1) to form the limiting space (122).

7. The battery pack according to claim 6, wherein an upper surface of the limiting sheet (21) is a horizontal surface, and at least a part of the upper surface of the limiting sheet (21) abuts against the blocking portion (125).

8. The battery pack according to claim 6, wherein an upper surface of the limiting sheet (21) is an inclined surface, the inclined surface is inclined upward in a direction X from a side of the limiting sheet (21) facing away from the snap-in assembly (22), and the inclined surface of the limiting sheet (21) is engaged with an end of the blocking portion (125).

9. The battery pack according to claim 1, wherein the limiting protrusion (12) is provided with a first opening (121) at a side in a direction X, the first opening (121) is in communication with the limiting space (122), and at least a portion of the limiting sheet (21) is inserted into the limit space (122) via the first opening (121).

\* \* \* \* \*